United States Patent [19]

Amico et al.

[11] Patent Number: 5,063,966
[45] Date of Patent: Nov. 12, 1991

[54] DIRECT DRIVE SERVOVALVE HAVING BEARING FILTER

[75] Inventors: Russell P. Amico, Castaic; George M. Klier, Granada Hills, both of Calif.

[73] Assignee: HR Textron Inc., Valencia, Calif.

[21] Appl. No.: 588,919

[22] Filed: Sep. 27, 1990

[51] Int. Cl.$^5$ .............................................. F15B 13/044
[52] U.S. Cl. ................................ 137/625.65; 137/544; 251/129.11
[58] Field of Search ............................. 137/625.65, 544; 251/129.11

[56] References Cited

U.S. PATENT DOCUMENTS 4,641,812  2/1987  Vanderlaan et al. ...... 251/129.11 X
4,672,992  6/1987  Vanderlaan et al. ...... 251/129.11 X Primary Examiner—Gerald A. Michalsky
Attorney, Agent, or Firm—Nilsson, Robbins, Dalgarn, Berliner, Carbon & Wurst

[57] ABSTRACT

A direct drive servovalve in which rotational motion of a motor rotor is converted into linear motion of a spool valve to direct fluid to a desired load. The drive motor is supported upon a housing within which the spool valve is disposed. The rotor of the drive motor engages the valve to cause it to reciprocate within a bore provided within the housing. A bearing supporting the rotor shaft is unsealed to permit fluid to flow through the bearing and into the interior of the rotor to provide lubrication and cooling. Disposed within the flow path are dirt shields at each end of the bearing which provide a tortious, labyrinth flow path for the fluid with spacing between the dirt shields and the bearing race being such as to allow fluid to flow but at the same time to remove contaminants entrained within the fluid.

5 Claims, 2 Drawing Sheets

DIRECT DRIVE SERVOVALVE HAVING BEARING FILTER

FIELD OF THE INVENTION

This invention relates to direct drive servovalves and more particularly to a direct drive servovalve in which rotational motion of a motor rotor is converted into linear motion of a spool valve wherein the operating fluid entering the drive motor is filtered through utilization of a bearing rotatably supporting the rotor.

BACKGROUND OF THE INVENTION

Torque motor-driven spool valves are well known in the art including such valves which operate through the utilization of a rotary torque motor having a drive member extending from the rotor thereof into contact with the spool valve to directly reciprocate the spool valve within a bore provided in the valve housing to thereby control the flow of fluid from a source thereof to the load in response to electrical signals applied to the drive motor. Typical of such direct drive servovalves is that illustrated in U.S. Pat. No. 4,793,377 issued Dec. 27, 1988, to Larry E. Haynes et al. The invention described and claimed herein is an improvement over the direct drive servovalve disclosed in U.S. Pat. No. 4,793,377 and therefore the disclosure of U.S. Pat. No. 4,793,377 is incorporated herein by this reference.

Other prior art known to applicants are U.S. Pat. Nos. 1,319,953; 2,264,635; 2,516,567; 3,762,784; 3,809,363; 4,249,782; 4,340,262; 4,408,808 and 4,772,136.

It is desirable in direct drive servovalves that the rotor of the drive motor be immersed in fluid for lubrication, heat transfer and pressure equalization. In prior-art valves, it has been traditional to allow the system fluid to freely flow into the rotor section of the motor. In such instances if the fluid is, or becomes, contaminated, foreign particles may become lodged in the rotor and degrade operation of the drive motor. Attempts to resolve this problem have resulted in the use of filters or seals to preclude passage of contaminants, however, such devices also limit the ability of the fluid to properly lubricate or transfer unwanted heat.

SUMMARY OF THE INVENTION

In accordance with the present invention, there is provided a direct drive servovalve which includes a valve spool reciprocally mounted within a bore in a valve housing along with motor means including a drive member to engage the valve for reciprocal movement within the bore to provide control over the flow of fluid through the valve. The motor means is mounted upon the valve housing by utilization of a bearing means which supports the rotor shaft of the motor by appropriate interference fits and locational slip fits utilizing the outer surface of the bearing in conjunction with a recess defined within the valve housing. Dirt shields are provided integral with the bearing means and disposed to provide a tortious labyrinth flow path for system fluid such that a barrier for contamination is provided without sealing the bearing.

DESCRIPTION OF THE ILLUSTRATIVE EMBODIMENT

Figure 1:
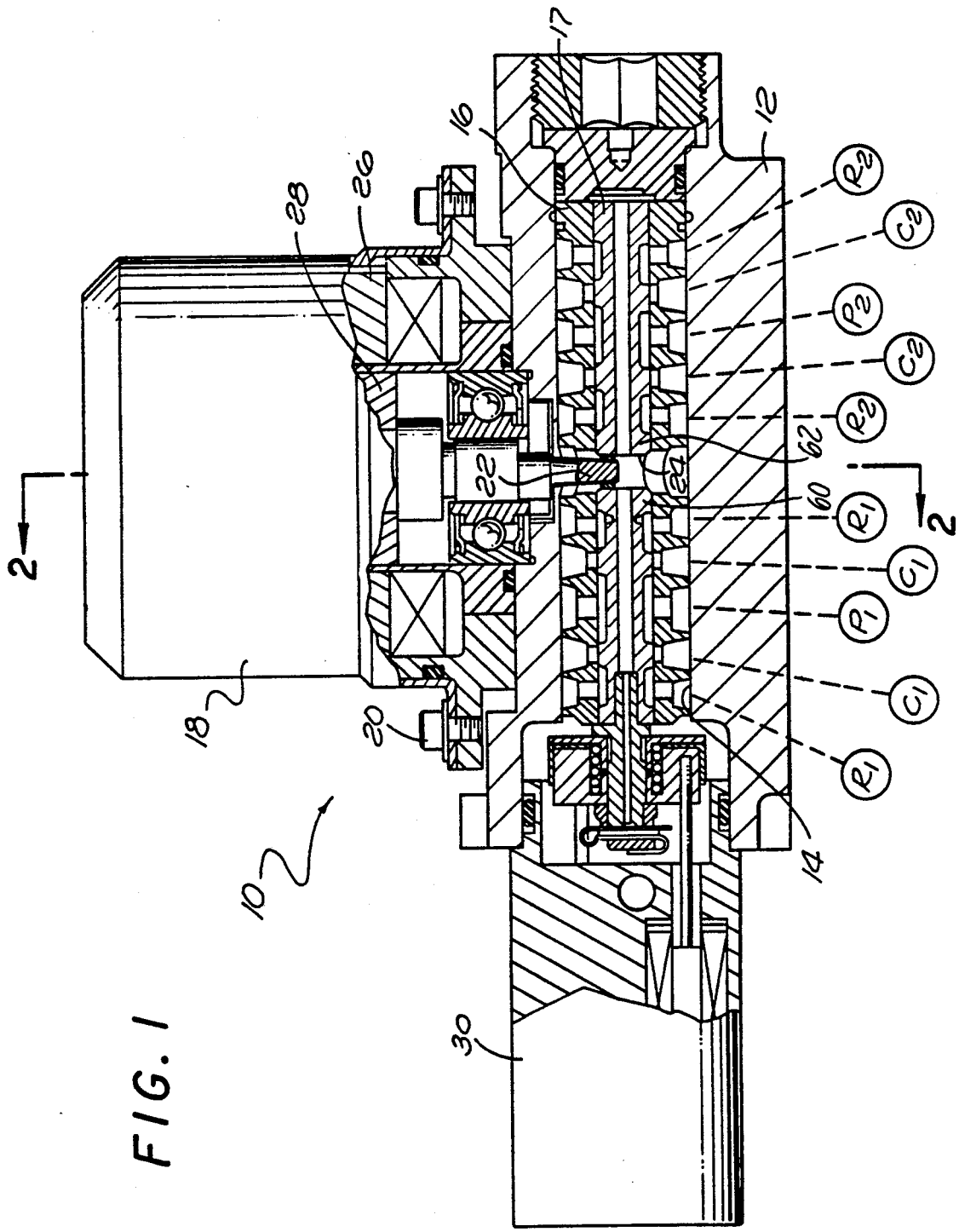
FIG. 1 is a longitudinal cross-sectional view of a direct drive servovalve constructed in accordance with the principles of the present invention.

By reference to FIG. 1, there is shown a direct drive valve 10 constructed in accordance with the principles of the present invention. As is therein shown, a valve housing 12 includes a bore 14 within which there is positioned a sleeve 16. A reciprocally movable spool valve 17 is mounted within the sleeve 16. A servovalve torque motor 18 is affixed to the housing 12 by means of bolts or other fasteners 20 so that a drive member 22 engages an opening 24 provided therefor in the spool 17 to move the spool 17 in response to electrical signals applied to the motor means 18 as is well known in the art.

Figure 2:
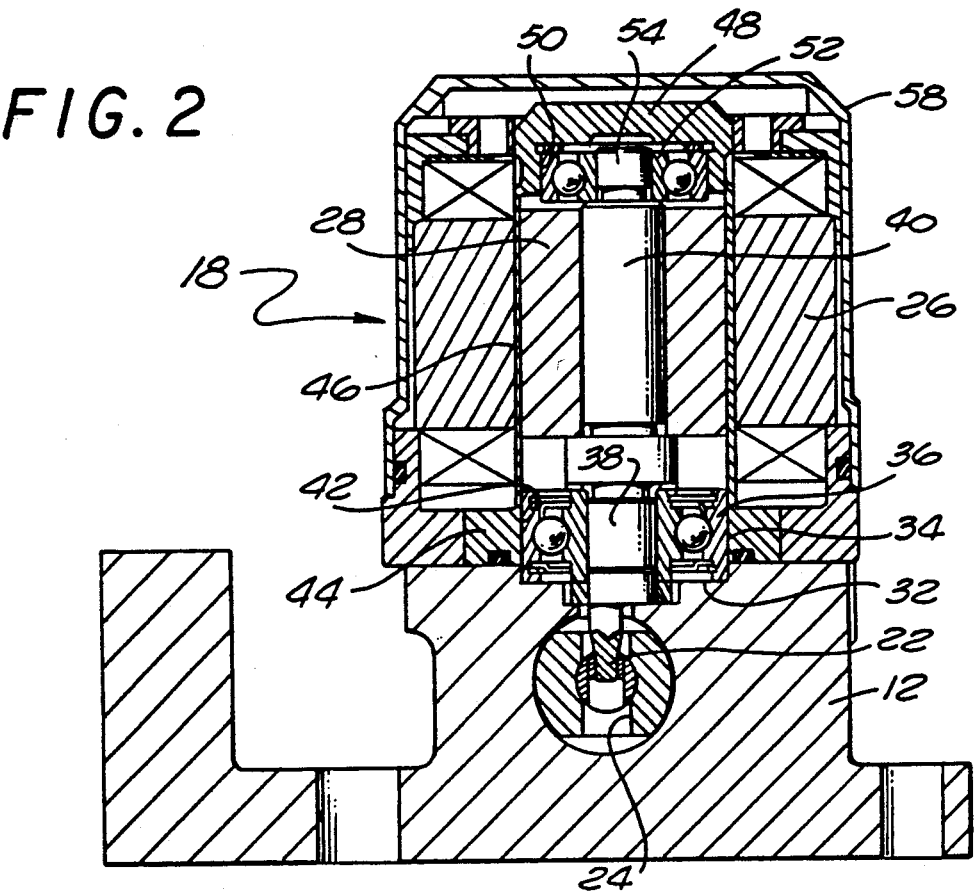
FIG. 2 is a cross-sectional view taken about the lines 2—2 of FIG. 1.

As is illustrated in FIGS. 1 and 2, the motor means is a rotary motor including a stator 26 and a rotor 28 as is well known in the art.

As is shown particularly in FIG. 1, the direct drive servovalve constructed in accordance with the principles of the present invention includes appropriate ports for the control of fluid from dual sources thereof under pressure P1 and P2 to, for example, a dual tandem actuator (not shown) and from the actuator to return through the utilization of dual cylinder ports. Such is indicated by the designations P1, R1 and C1 as well as P2, R2 and C2. The valve assembly 10 may also include an LVDT 30 as is well known in the prior art. The construction of the rotary direct drive servovalve as illustrated in FIGS. 1 and 2 and thus far described is well known in the prior art and additional detail with regard thereto is not believed to be necessary. Additional description will be given in detail directed to the specific details of the improvement of the present invention wherein the bearing means by which the motor means 18 is mounted upon the valve housing 12 is used to filter the operating fluid which enters the rotor section of the motor.

As is shown more particularly in FIG. 2, the valve housing 12 defines a first recess 32 which receives the outer surface 34 of a bearing means 36 mounted upon one end 38 of the rotor shaft 40 to the motor means 18. The recess 32 conforms to the outer surface 34 cross-sectional configuration of the bearing 36 and has a depth which is substantially less than the longitudinal length of the outer surface 34 of the bearing 36. As a result and as is clearly illustrated in FIGS. 1 and 2, when the bearing is received within the recess 32, a substantial portion of the outer surface 34 thereof protrudes from the housing 12.

As a result of the longitudinal dimension of the outer surface 34 of the bearing 36, it can be seen from FIGS. 1 and 2 that the bearing is mutually received within a second recess 42 defined by the lower portion 44 of the isolation tube 46. The isolation tube 46 surrounds the rotor 28 of the motor means 18 and isolates hydraulic fluid from the stator portion 26 of the motor means 18.

The isolation tube 46 also includes an upper portion 48 thereof which defines a third recess 50 which receives a second bearing means 52. The bearing means 36 and 52 are utilized to support the rotor shaft 40 in a properly aligned position within the isolation tube 46. Such alignment is obtained by inserting the end 54 of the shaft 40 by way of an interference fit into the inner race of the bearing means 52. The outer race of the bearing means 52 is then inserted by means of a locational slip fit between the third recess 50 and the outer race of the bearing means 52. The bearing means 36 is then inserted by means of an interference fit between the outer surface 34 of the bearing means 36 and the second recess 42 inner surface as provided in the lower portion 44 of the isolation tube 46. A locational slip fit is provided between the lower portion 38 of the shaft 40 and the inner race of the bearing means 36. Subsequent to this assembly, which now provides essentially a solid structure between the isolation tube 46 and the rotor 28, the assembly is inserted into the first recess 32 by a locational slip fit between it and the outer surface 34 of the bearing means 36.

After such assembly as described above, the stator is positioned along with the cover 58 and appropriate securing mechanisms are provided in place to complete the assembly.

As indicated above, it is desirable to permit hydraulic fluid to flow into the rotor 28 region internally of the isolation tube 46 to provide for appropriate lubrication and heat transfer during operation of the valve. To provide the flow of such fluid, a clearance is provided between the inner surface of the sleeve 16 and the lands 60-62 of the spool 17. As a result of this clearance which is in the order of 0.05 mils, fluid is allowed to flow from the returns R1-R2 into the opening 24 of the spool thereby allowing fluid to flow through the bearing 36 (as will be described more in detail below) and into the rotor region of the motor 18. It will be recognized by those skilled in the art that by providing a clearance on the order of 0.05 mils between the lands 60-62 and the inner surface of the sleeve 16, foreign particles which may be entrained within the hydraulic fluid utilized in the system are for the most part blocked. However, very small particles obviously can pass through this clearance and into the area occupied by the stator.

It is important that the fluid that enters the stator region of the motor 18 be as free from foreign particle contamination as is possible. It is particularly imporatant that such fluid be free of metallic particles of any type. The necessity for such fluid cleanliness is that the clearance between the outer surface of the rotor 28 and the inner surface of the isolation tube 46 is on the order of 0.005 of an inch, therefore, any foreign contaminating particles of any substantial size would cause a degraded performance of the motor means 18. Furthermore, if metallic particles are entrained within the fluid, they would be attracted by the permanent magnets utilized in the motor means 18 further degrading the performance thereof.

To further trap any foreign particles which may be entrained within the fluid entering the rotor of the motor means 18, the bearing 36 is designed to function as an additional filter for the fluid flow.

Figure 3:
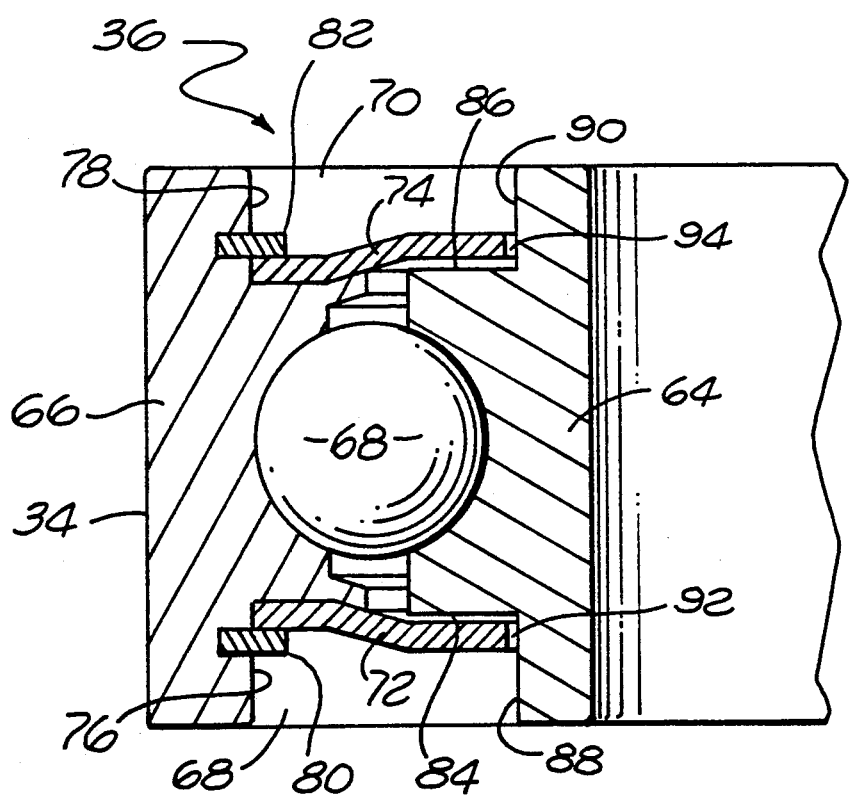
FIG. 3 is an enlarged cross sectional view of one half of a bearing that may be used in accordance with the principals of the present invention.

As is seem more specifically in FIG. 3, the filter means 36 includes an inner race 64 and an outer race 66. The outer race 66 defines the outer surface 34 as above described. A plurality of bearing means such as illustrated by the ball 68 are supported between the races 64 and 66 as is well known to those skilled in the art. To provide fluid flow through the bearing 36, no seal is provided at either end 68 or 70 of the bearing 36. A dirt shield 72 and 74 is provided at each of the ends 68 and 70 respectively of the bearing 36. The dirt shields 72 and 74 are formed of annular members which are received within appropriate recesses 76-78 and are held in place by snap rings 80 and 82. Each of the dirt shields at the end opposite the retaining snap rings overlaps a shoulder 84-86 formed by an appropriate recess 88-90 formed in the inner race 64. The clearance between the dirt shields 72-74 and the shoulders 84-86 respectively is on the order of 0.010 to 0.020 of an inch and a similar clearance is provided between the recesses 88 and 90 and the inner end edge of the dirt shields 72.

Considering the structure shown in FIG. 3 and its incorporation into the structure shown in FIG. 1 and 2, it will be recognized by those skilled in the art that in the absence of bearing seals at the ends 68 and 70 of the bearing 36, fluid from the returns $R_1$ or $R_2$ entering the cavity within which the lower portion 38 of the shaft 40 extends will be permitted to flow through the bearing 36 along the path 92 formed between the inner race 64 and the dirt shield 72 through the bearing 68 and along the path 94 formed between the dirt shield 74 and the inner race 64 and into the rotor portion of the motor means 18. Likewise the fluid can reverse the path just described in the event pressure change permits such a flow. Through utilization of such a fluid flow, adequate lubrication is provided for the bearings within the rotor portion of the motor means 18 and also assist in the transfer of heat generated in the motor means. It will be seen by those skilled in the art that by providing such a tortious labyrinth path for the flow of fluid through the bearing means without seals that any additional foreign contaminants which may be entrained within the fluid will be trapped thereby assuring that the fluid which enters the rotor region of the motor means 18 is substantially free of such foreign contaminants.

What is claimed is:

1. A direct drive servovalve comprising;
   (1) a valve housing defining a bore therein;
   (2) a valve spool reciprocally received within said bore for movement to control fluid flow therethrough from a supply port;
   (3) motor means including a rotor section having a drive member for engagement with said valve spool at a predetermined position to move said valve spool in said bore; and
   (4) unsealed bearing means supporting said rotor section comprising:
      (a) an inner and an outer bearing race, each having a first and a second end, with a plurality of bearing means disposed therebetween, said inner bearing race engaging said rotor;
      (b) a first dirt shield means carried by one of said inner and outer races at said first end between said fluid adjacent said valve spool and said rotor section;
      (c) a second dirt shield means carried by one of said inner and outer races at said second end; and
      (d) each of said first and second dirt shield means being spaced from the other of said first and second races by an amount to permit flow of said fluid through said unsealed bearing means while trapping containment particles entrained in said fluid.

2. A direct drive servovalve as defined in claim 1 wherein each of said first and second dirt shields means is an annulus carried by said outer bearing race, and said inner bearing race defines a first and second shoulder adjacent said first and second end thereof respectively, said annulus overlapping said shoulder to define a tortuous, labyrinth flow path for said fluid.

3. A direct drive servovalve as defined in claim 2 wherein said annulus is spaced from said inner race by an amount between 0.010 and 0.020 inches along opposed surfaces.

4. A direct drive servovalve as defined in claim 3 wherein fluid leakage is provided around said spool valve adjacent said predetermined position to supply fluid to said rotor section.

5. A direct drive servovalve as defined in claim 2 wherein said inner and outer races together define first and second recesses at said first and second ends respectively, said first and second dirt shield annulus being received within said first and second recess respectively, and which further includes retaining means securing each said annulus in its respective recess.

* * * * *